United States Patent
Tsai

(10) Patent No.: US 7,517,111 B2
(45) Date of Patent: Apr. 14, 2009

(54) COMPUTER HAVING A LUMINOUS DEVICE CAPABLE OF PROVIDING A UNIFORM LUMINESCENCE DISTRIBUTION

(75) Inventor: Hung-Chieh Tsai, Taipei Hsien (TW)

(73) Assignee: Aopen Inc., Taipei Hsien (TW)

( * ) Notice: Subject to any disclaimer, the term of this patent is extended or adjusted under 35 U.S.C. 154(b) by 0 days.

(21) Appl. No.: 11/653,267

(22) Filed: Jan. 16, 2007

(65) Prior Publication Data

US 2007/0230160 A1 Oct. 4, 2007

(30) Foreign Application Priority Data

Apr. 3, 2006 (TW) ............................... 95205580 U

(51) Int. Cl.
*F21V 21/00* (2006.01)

(52) U.S. Cl. ..................... 362/249; 361/683; 362/612

(58) Field of Classification Search ................ 362/231, 362/249, 545, 600, 602, 608, 610, 612, 613, 362/623, 626; 361/683

See application file for complete search history.

(56) References Cited

U.S. PATENT DOCUMENTS 5,815,225 A * 9/1998 Nelson ........................ 349/65
6,341,872 B1 * 1/2002 Goto ........................... 362/623
6,494,593 B2 * 12/2002 An et al. ...................... 362/249
6,601,984 B2 * 8/2003 Yamamoto et al. .......... 362/600
6,776,491 B2 * 8/2004 Nakamura et al. ............ 353/31
6,933,929 B1 * 8/2005 Novak ......................... 345/173
2007/0064418 A1 * 3/2007 Huang et al. ................ 362/231

* cited by examiner

*Primary Examiner*—Hargobind S Sawhney
(74) *Attorney, Agent, or Firm*—Davidson Berquist Jackson & Gowdey LLP

(57) ABSTRACT

A computer includes a main housing having a front wall formed with a slot therethrough, and a luminous device. The luminous device includes an elongated insert plate and a light source. The insert plate is made of a transparent light conducting material, and has an insert portion disposed fixedly within the slot in the main housing, and a serrated reflecting portion disposed behind the insert portion and formed with a plurality of interconnected light-reflecting surfaces. Any two adjacent reflecting surfaces form an angle therebetween. The light source is attached fixedly to the insert plate, and directs light toward the reflecting portion of the insert plate. Light emitted from the light source is diffused by the reflecting surfaces so that the insert portion of the insert plate has a uniform luminescence distribution.

13 Claims, 4 Drawing Sheets

COMPUTER HAVING A LUMINOUS DEVICE CAPABLE OF PROVIDING A UNIFORM LUMINESCENCE DISTRIBUTION

CROSS-REFERENCE TO RELATED APPLICATION

This application claims priority of Taiwanese Application No. 095205580, filed on Apr. 3, 2006.

BACKGROUND OF THE INVENTION

1. Field of the Invention

This invention relates to a computer, and more particularly to a computer that has a luminous device, which is capable of providing a uniform luminescence distribution.

2. Description of the Related Art

A current computer is typically provided with an elongated luminous device for generating light at a specific position of the computer for aesthetic purposes when the computer is in a powered-on state. The luminescence distribution of such a luminous device, however, is uneven. That is, the luminous device is darker at positions farther away from a light source thereof than at positions close to the light source.

SUMMARY OF THE INVENTION

The object of this invention is to provide a computer that has a luminous device that is capable of providing a uniform luminescence distribution when the computer is in a powered-on state.

According to this invention, a computer includes a main housing having a surrounding wall formed with a slot therethrough, and a luminous device. The luminous device includes an elongated insert plate and a light source. The insert plate is made of a transparent light conducting material, and has an insert portion that is disposed fixedly within the slot in the main housing, and a serrated reflecting portion that is disposed behind the insert portion and that is formed with a plurality of interconnected light-reflecting surfaces. Any two adjacent reflecting surfaces form an angle therebetween. The light source is attached fixedly to the insert plate, and directs light toward the reflecting portion of the insert plate. Light emitted from the light source is diffused by the reflecting surfaces. Thus, the insert portion of the insert plate has a uniform luminescence distribution.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
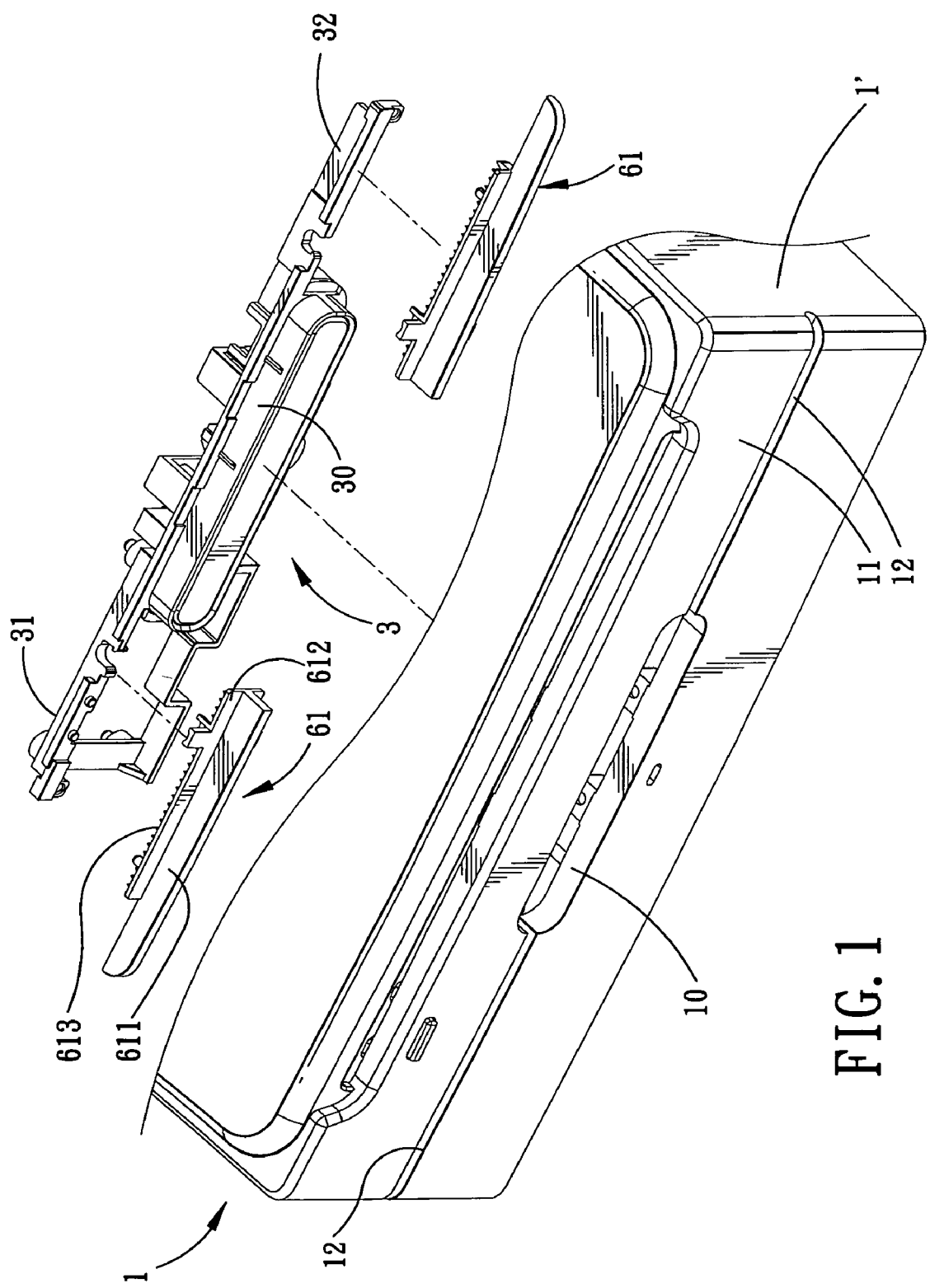
FIG. 1 is a fragmentary, partly exploded front perspective view of the preferred embodiment of a computer according to this invention.
Figure 3:
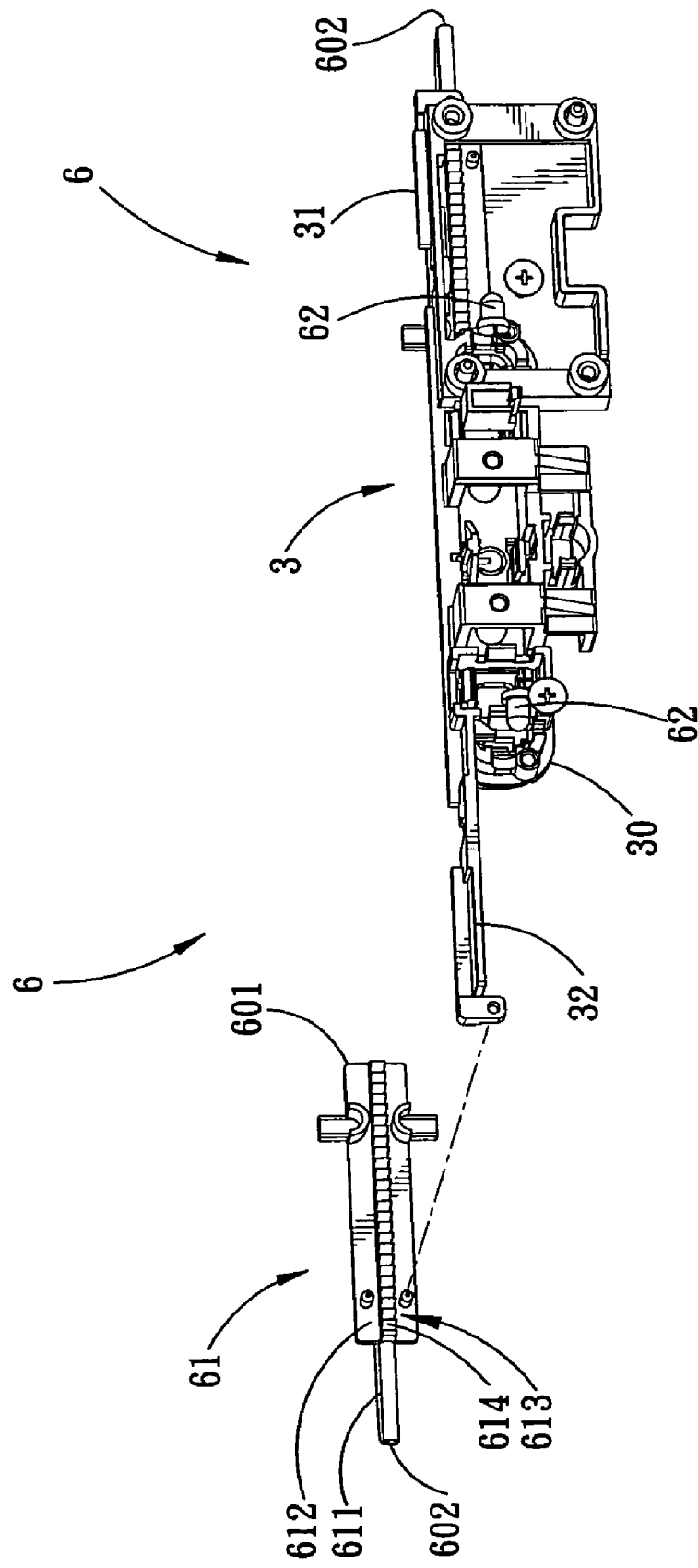
FIG. 3 is a fragmentary, partly exploded rear perspective view of the preferred embodiment.

Referring to FIGS. 1 and 3, the preferred embodiment of a computer according to this invention includes a main housing 1, a support member 3, and two luminous devices 6. The main housing 1 has a surrounding wall 1' that is an aluminum extrusion. The surrounding wall 1' has a front wall portion 11 formed with an oblong switch-mounting hole 10 and two slots 12 therethrough. The slots 12 are aligned with each other along a horizontal direction. The switch-mounting hole 10 is disposed at a central portion of the front wall portion 11 and between the slots 12. The luminous devices 6 are aligned respectively with the slots 12. The number and positions of the slots 12 and the luminous devices 6 may be changed.

The support member 3 is formed by plastic injection molding, and has an integral annular wall 30 disposed fixedly and fittingly within the switch-mounting hole 10 in the front wall portion 11 of the main housing 1, and left and right side wings 31, 32 extending respectively and integrally from two opposite ends of the annular wall 30. The annular wall 30 has two opposite end portions disposed respectively in proximity to the slots 12 in the main housing 1. The annular wall 30 and the left and right side wings 31, 32 are designed so as to permit an integration type switch device to be mounted thereon. Since the integration type switch is not pertinent to the claimed invention, a detailed description of the annular wall 30 and the left and right side wings 31, 32 will be omitted herein for the sake of brevity.

Figure 2:
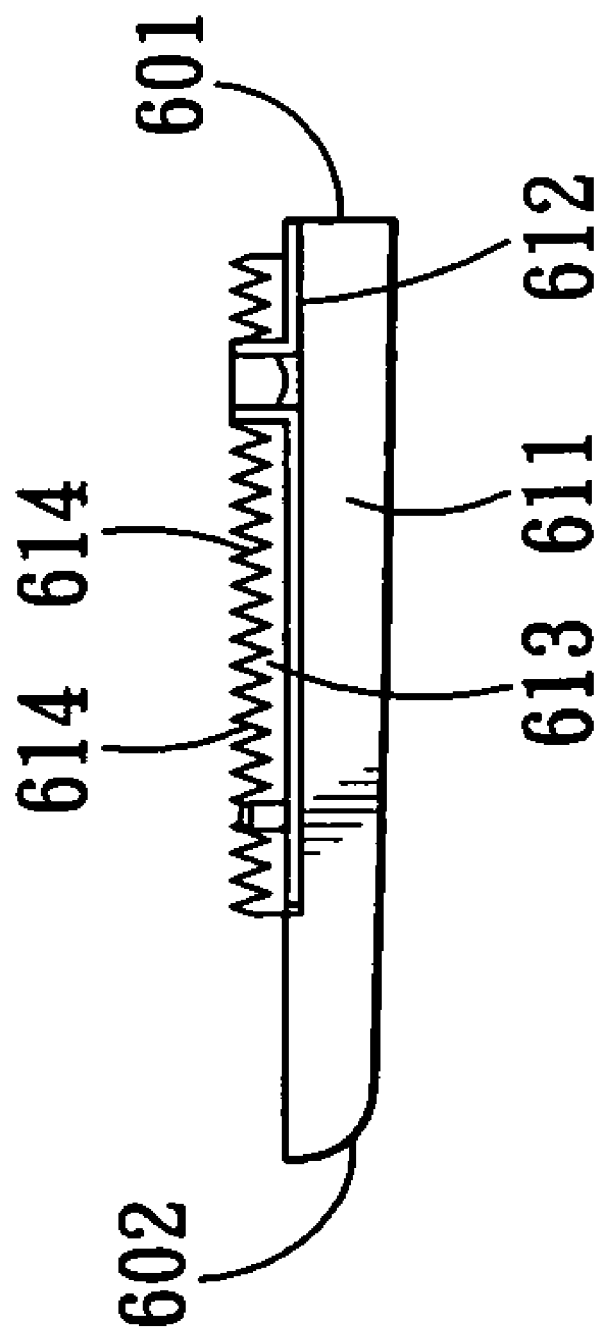
FIG. 2 is a top view of an insert plate of a luminous device of the preferred embodiment.
Figure 4:
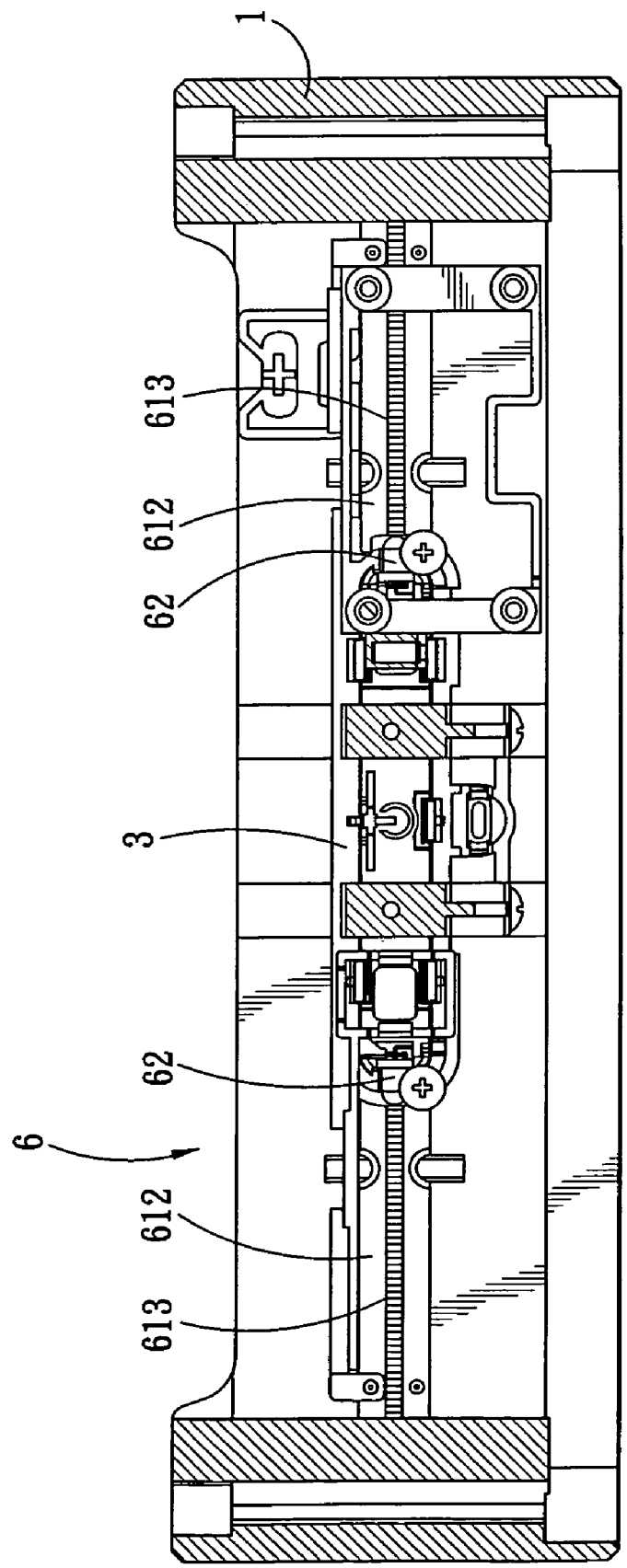
FIG. 4 is a fragmentary, partly sectional rear view of the preferred embodiment.

With further reference to FIGS. 2 and 4, each of the luminous devices 6 includes an elongated insert plate 61 and a light source 62. Each of the insert plates 61 is made of a transparent light conducting material, and has an insert portion 611, a vertical position-limiting rib portion 612, and a serrated reflecting portion 613. In this embodiment, the insert plates 61 are formed from an optical plastic material by injection molding. The light sources 62 are disposed respectively behind the two end portions of the annular wall 30 of the support member 3 for directing light away from each other. Since the luminous devices 6 are similar in construction to each other, only one of the luminous devices 6 will be described in the succeeding paragraph.

The insert portion 611 is disposed fixedly and fittingly within the corresponding slot 12 in the main housing 1. The reflecting portion 613 is disposed behind the insert portion 611, and is formed with a plurality of interconnected light-reflecting surfaces 614. Any two adjacent reflecting surfaces 614 form an acute angle therebetween. The position-limiting rib portion 612 is disposed between the insert portion 611 and the reflecting portion 613, and abuts against an inner surface (i.e., rear surface) of the front wall portion 11 so as to prevent forward removal of the insert plate 61 from the corresponding slot 12 in the main housing 1. The insert plate 61 further has a first end 601 proximate to the center of the front wall portion 11, and a second end 602 opposite to the first end 601 and distal from the center of the front wall portion 11. The light source 62 is disposed in proximity to the first end 601 of the insert plate 61, and directs light toward the second end 602 of the insert plate 61. Light emitted from the light source 62 is diffused by the reflecting surfaces 614. As a result, the insert portion 611 has a uniform luminescence distribution. Therefore, the object of this invention is achieved.

With this invention thus explained, it is apparent that numerous modifications and variations can be made without departing from the scope and spirit of this invention. It is therefore intended that this invention be limited only as indicated by the appended claims.

I claim:

1. A computer comprising:
   a main housing having a surrounding wall formed with a slot therethrough; and
   a luminous device including an elongated insert plate made of a transparent light conducting material and having an insert portion that is disposed fixedly within said slot in said main housing, and a serrated reflecting portion that is disposed behind said insert portion and that is formed with a plurality of interconnected light-reflecting surfaces, any two adjacent ones of said reflecting surfaces forming an angle therebetween, and a light source for directing light toward said reflecting portion of said insert plate such that light emitted from said light source is diffused by said reflecting surfaces so that said insert portion of said insert plate has a uniform luminescence distribution;

wherein said surrounding wall has a front wall portion, said insert plate further having a vertical position-limiting rib portion disposed between said insert portion and said reflecting portion and abutting against an inner surface of said front wall portion of said main housing so as to prevent forward removal of said insert plate from said slot in said main housing.

2. The computer as claimed in claim 1, wherein said angle is acute.

3. The computer as claimed in claim 1, wherein said light source is disposed in proximity to said reflecting portion of said insert plate.

4. The computer as claimed in claim 1, wherein said insert plate is made of an optical plastic material.

5. A computer comprising:

a main housing having a surrounding wall formed with two slots therethrough; and two luminous devices aligned respectively with said slots in said main housing, each of said luminous devices including an elongated insert plate made of a transparent light conducting material and having an insert portion that is disposed fixedly within said slot in said main housing, and a serrated reflecting portion that is disposed behind said insert portion and that is formed with a plurality of interconnected light-reflecting surfaces, any two adjacent ones of said reflecting surfaces forming an angle therebetween, and a light source attached fixedly to said insert plate and directing light toward said reflecting portion of said insert plate such that light emitted from said light source is diffused by said reflecting surfaces so that said insert portion of said insert plate has a uniform luminescence distribution;

wherein said surrounding wall has a front wall portion, each of said insert plates further having a vertical position-limiting rib portion disposed between a corresponding one of said insert portions and a corresponding one of said reflecting portions and abutting against an inner surface of said front wall of said main housing so as to prevent forward removal of the corresponding one of said inserts plates from a corresponding one of said slots in said main housing.

6. The computer as claimed in claim 5, wherein said angle is acute.

7. The computer as claimed in claim 5, wherein said surrounding wall has a front wall portion, said slots in said main housing being formed in said front wall portion, and being aligned with each other.

8. The computer as claimed in claim 7, wherein said front wall portion of said main housing is further formed with a switch-mounting hole disposed between said slots, said computer further comprising a support member formed with an integral annular wall disposed fixedly and fittingly within said switch-mounting hole in said main housing, said annular wall having two opposite end portions disposed respectively in proximity to said slots in said main housing, said light sources being disposed respectively behind said two end portions of said annular wall for directing light away from each other.

9. The computer as claimed in claim 5, wherein said reflecting portion of each of said insert plates has two opposite ends, each of said light sources being disposed in proximity to one of said ends of a corresponding one of said reflecting portions and directing light toward the other of said ends of the corresponding one of said reflecting portions.

10. A computer comprising:

a main housing having a surrounding wall formed with two slots therethrough; and two luminous devices aligned respectively with said slots in said main housing, each of said luminous devices including an elongated insert plate made of a transparent light conducting material and having an insert portion that is disposed fixedly within said slot in said main housing, and a serrated reflecting portion that is disposed behind said insert portion and that is formed with a plurality of interconnected light-reflecting surfaces, any two adjacent ones of said reflecting surfaces forming an angle therebetween, and a light source attached fixedly to said insert plate and directing light toward said reflecting portion of said insert plate such that light emitted from said light source is diffused by said reflecting surfaces so that said insert portion of said insert plate has a uniform luminescence distribution;

wherein said surrounding wall has a front wall portion, said slots in said main housing being formed in said front wall portion, and being aligned with each other;

wherein said front wall portion of said main housing is further formed with a switch-mounting hole disposed between said slots, said computer further comprising a support member formed with an integral annular wall disposed fixedly and fittingly within said switch-mounting hole in said main housing, said annular wall having two opposite end portions disposed respectively in proximity to said slots in said main housing, said light sources being disposed respectively behind said two end portions of said annular wall for directing light away from each other.

11. The computer as claimed in claim 10, wherein said angle is acute.

12. The computer as claimed in claim 10, wherein said surrounding wall has a front wall portion, each of said insert plates further having a vertical position-limiting rib portion disposed between a corresponding one of said insert portions and a corresponding one of said reflecting portions and abutting against an inner surface of said front wall of said main housing so as to prevent forward removal of the corresponding one of said inserts plates from a corresponding one of said slots in said main housing.

13. The computer as claimed in claim 10, wherein said reflecting portion of each of said insert plates has two opposite ends, each of said light sources being disposed in proximity to one of said ends of a corresponding one of said reflecting portions and directing light toward the other of said ends of the corresponding one of said reflecting portions.

* * * * *